4 Sheets—Sheet 1.
T. WEBBER.
APPARATUS FOR TREATING BLOOD, TANK OFFAL &c.
No. 170,036. Patented Nov. 16, 1875.
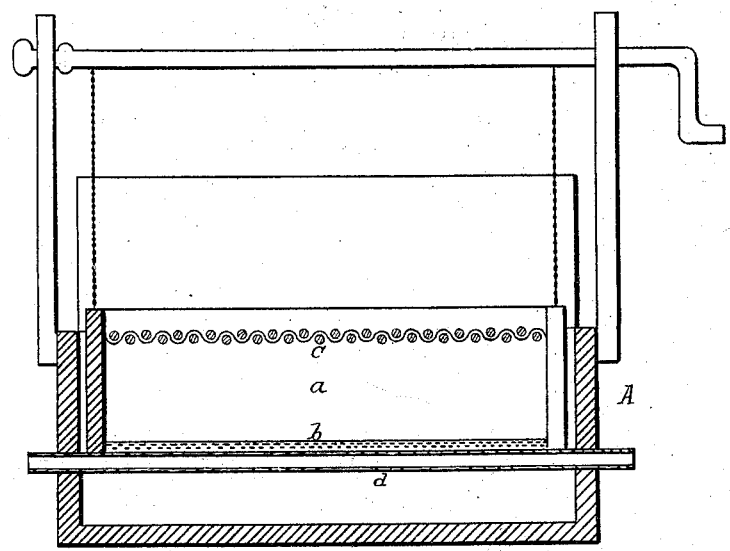
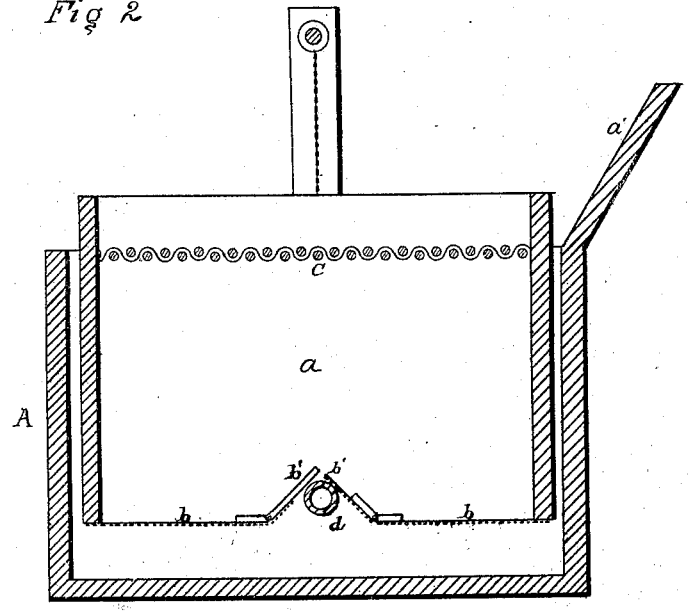
WITNESSES
Thomas Bernard
Bryan H. Moise
INVENTOR
Thos. Webber.
Chipman Hosmer & Co
ATTORNEYS

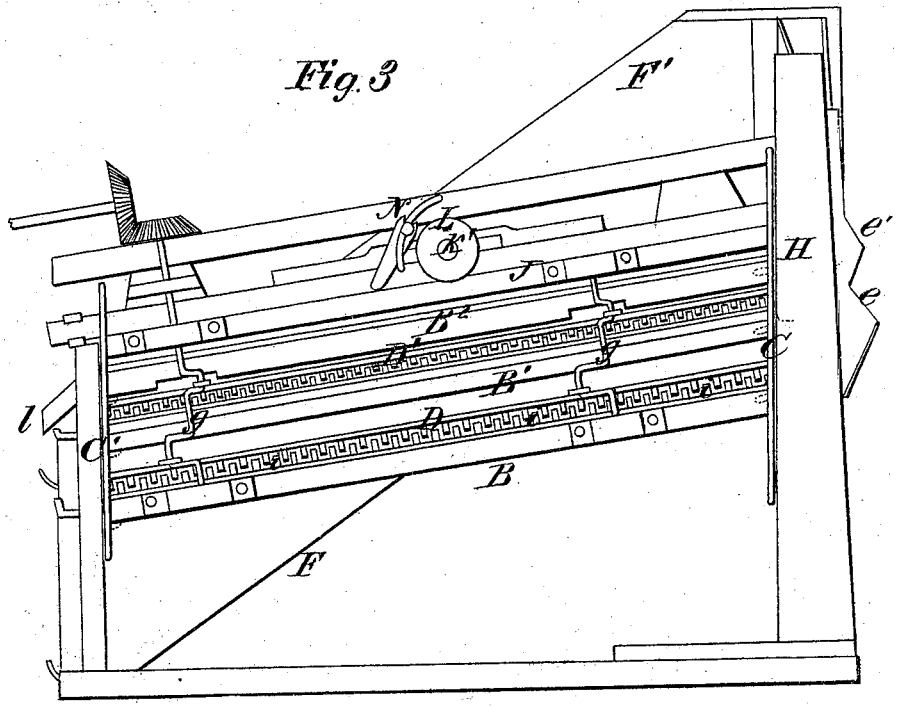
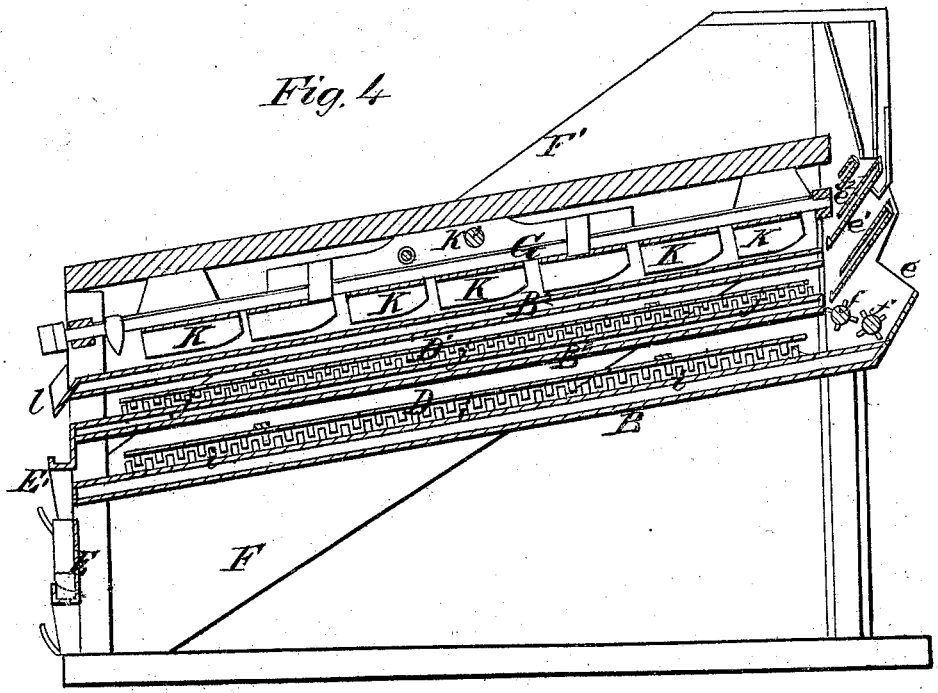

4 Sheets—Sheet 3.

T. WEBBER.
APPARATUS FOR TREATING BLOOD, TANK OFFAL &c.

No. 170,036. Patented Nov. 16, 1875.

WITNESSES
Thomas Bernard
Bryan H. Morse

INVENTOR
Thos. Webber
Chipman Hosmer & Co.
ATTORNEYS

4 Sheets—Sheet 4.

T. WEBBER.
APPARATUS FOR TREATING BLOOD, TANK OFFAL &c.

No. 170,036. Patented Nov. 16, 1875.

WITNESSES
Thomas Bernard
Bryan H. Morse

INVENTOR
Thos. Webber.
Chipman Hosmer & Co
ATTORNEYS

UNITED STATES PATENT OFFICE.

THOMAS WEBBER, OF CHICAGO, ILLINOIS.

IMPROVEMENT IN APPARATUS FOR TREATING BLOOD, TANK-OFFAL, &c.

Specification forming part of Letters Patent No. 170,036, dated November 16, 1875; application filed September 18, 1875.

*To all whom it may concern:*

Be it known that I, THOMAS WEBBER, of Chicago, in the county of Cook and State of Illinois, have invented a new and valuable Improvement in Evaporating and Utilizing Tank-Offal, Blood, Animal Matter, &c.; and I do hereby declare that the following is a full, clear, and exact description of the construction and operation of the same, reference being had to the annexed drawings, making a part of this specification, and to the letters and figures of reference marked thereon.

Figure 5:
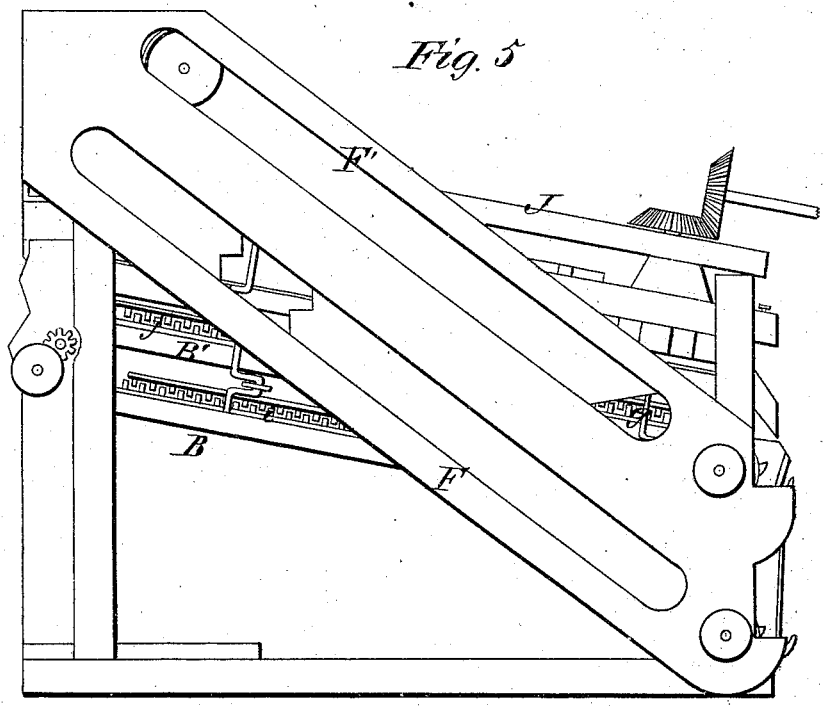
Figure 6:
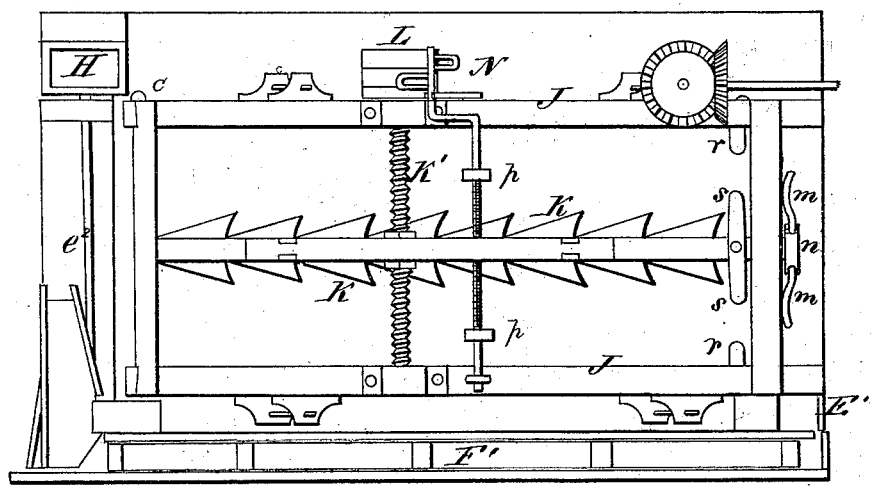
Figure 7:
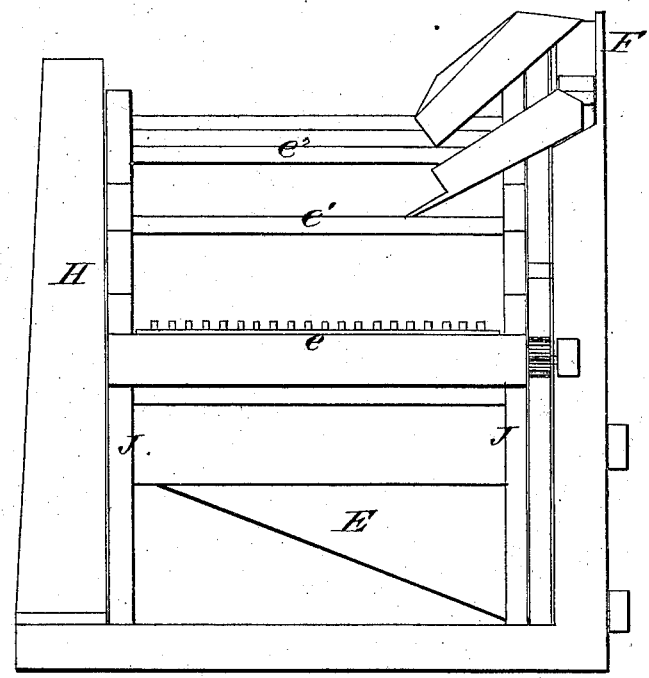
Figure 8:
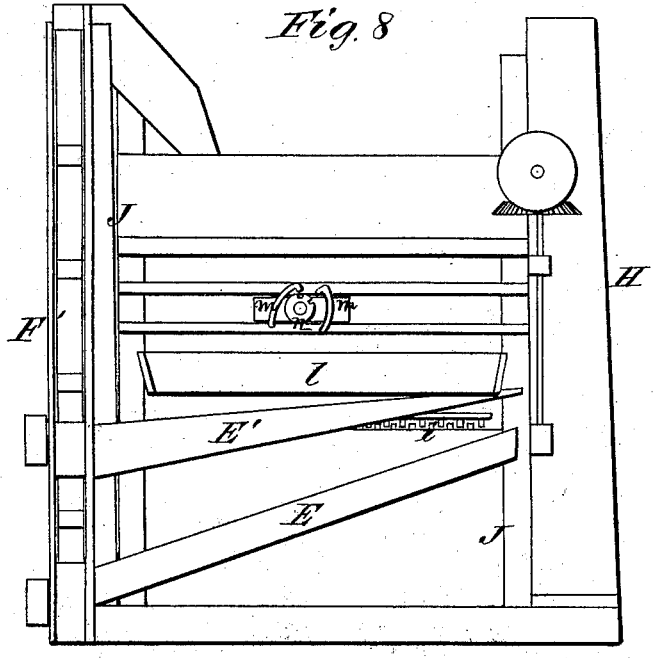

Figure 1 of the drawings is a representation of a longitudinal vertical section of my tank, and Fig. 2 is a transverse vertical sectional view thereof. Fig. 3 is a side view, and Fig. 4 a longitudinal vertical sectional view. Fig. 5 is a side elevation, Fig. 6 a plan view, and Figs. 7 and 8 end views thereof.

This invention has relation to means for treating tank-offal, blood, and other animal matters for fertilizing purposes; and the nature of my invention consists in an apparatus for cooking the blood or other animal matter in water, and readily separating the cooked mass from the water; also, in certain novel means for disintegrating the animal matter, and at the same time thoroughly desiccating, as will be hereinafter explained.

In the annexed drawings, Sheet 1, I have represented the apparatus for cooking blood previous to drying and disintegrating it. This apparatus consists of a tank, A, of any suitable capacity, inside of which tank is a box, $a$, having a strainer, $b$, in its bottom, and a removable screen, $c$, near its top. The bottom strainer has two perforated sections, $b'$ $b'$, hinged to it, which assume inclined positions over a steam-heater, $d$, when the box $a$ is in its place in the tank A. In the act of raising the box $a$, the sections $b'$ $b'$ will close and prevent the escape of the contents of the box $a$. The blood is supplied to the box $a$ over an inclined chute, $a'$, and when the blood has been cooked, the box $a$ is lifted out of the tank by means of chains and a crank-shaft, and one side of said box is turned down and the contents deposited into a hopper, $e$, of the drying and disintegrating apparatus. (Represented on Sheets 2, 3, and 4.) From the hopper $e$ the material passes between two studded crushing-rollers, $f$ $f$, both of which receive positive rotary motion. These crushers impel the material forward upon a trunk or hollow bed, B, which is inclined and thickly armed with studs $i$ upon its upper side, and which is supplied with steam from a pipe, C. The water of condensation is conducted off through a pipe, C', at the lower end of the trunk B. D designates a perforated stirrer, into the lower side of which a number of studs are fixed, and so arranged as to play around the studs $i$ on the trunk B. The stirrer D receives from crank-shafts $g$ $g$ rotary motion, and each stirring-stud revolves around four stationary studs, $i$, and not only stirs the material, but disintegrates it, and finally discharges it into an inclined trough, E, at the lower end of the trunk B. The material receives its first drying process on the trunk B, and is delivered, by means of the trough E, to an elevator, F, which carries it up and deposits it into a hopper, $e^1$. From the hopper $e^1$ the material falls upon an inclined trunk, $B^1$, which, like the trunk B, is supplied with steam from pipe C, and connected to the waste-pipe C'. The upper side of the trunk $B^1$ is armed with studs $j$, between which work similar studs, which are fixed to the bottom of a stirring-plate, D', to which rotation is given by means of the crank-shafts $g$ $g$. The studs of the stirrer D' revolve around each stud on the trunk $B^1$, and keep the material in constant motion, so that the heat from the trunk $B^1$ will operate to the best advantage to dry it. The material which has been subjected to the second drying operation is conducted to an elevator, F', by means of a trough, E', and carried back and deposited into a hopper, $e^2$. From this hopper $e^2$ the material falls upon a trunk, $B^2$, and is stirred from side to side thereof by means of shovels K, which are secured in pairs to a longitudinal rock-shaft, G. These shovels are curved, as shown, and their acting edges are oblique to the length of their shaft. The shovels not only move the material from side to side of the trunk $B^2$, but they also move it in a direction with the length of this trunk, and finally discharge it from the machine over a chute, $l$. The trunk $B^2$ is supplied with steam from the pipe C, and the waste-water is carried off through pipe $C'$. The inclined hopper-bottoms shown at the ends of the trunks B $B^1$ $B^2$ are hollow, and their lower ends are open, for the purpose of receiving the vapor from the material being dried, and conducting it to a chimney, H, which affords the necessary draft. The shovel-carrying shaft G has its end bearings in journal-blocks, which are free to slide between horizontal transverse guides fixed to the ends of the frame J. At the middle of the length of the shaft G a screw, $K'$, is tapped through it, which screw has its bearings on top of the frame J, and carries belt-pulleys L on one end. N designates a belt-shifter for the belts used to turn screw $K'$, on the shaft of which shifter adjustable stops $p$ $p$ are applied, against which the shaft G strikes at the termini of its strokes.

By these means the shaft G is moved slowly from side to side of the trunk $B^2$, and all the material thereon is subjected to the action of the shovels K. The shovels are held down to their work by means of pawls $m$ $m$ engaging, one at a time, with a notched wheel, $n$, on shaft G, and the shovels are automatically brought into operation by means of shifting-pieces $r$ $r$ acting on curved arms fixed to the shaft G. These tilt the shaft G, first to the right and then to the left, and bring the two rows of shovels alternately into play.

What I claim, and desire to secure by Letters Patent, is—

1. In an apparatus for preparing blood and other animal matter for fertilizing purposes, the tank A, provided with a heater, $d$, in combination with the removable box $a$, having a strainer, $b$, and a removable screen, $c$, substantially as described.

2. The hoppers $e$ $e^1$ $e^2$, in combination with the heating-trunks and chimney, substantially as and for the purpose set forth.

3. The perforated plate D, having stirrers, in combination with the studded trunk B, operating substantially as and for the purpose set forth.

4. The hopper $e$ and crushing-rollers $f$ $f$, in combination with the drying studded trunk B and steam-pipe C, substantially as and for the purpose set forth.

5. In a drying apparatus, the combination of the trunk B, trough E, elevator F, hopper $e^1$, and the studded trunk $B^1$, operating substantially as and for the purpose set forth.

6. The reciprocating shaft G, having a series of shovels, K, in combination with the trunk $B^2$, substantially as described.

In testimony that I claim the above I have hereunto subscribed my name in the presence of two witnesses.

THOMAS WEBBER.

Witnesses:
WALTER C. MASI,
BRYAN H. MORSE.